United States Patent
James et al.

(10) Patent No.: US 7,975,799 B2
(45) Date of Patent: Jul. 12, 2011

(54) METHOD AND APPARATUS FOR STORING AND SUPPLYING A FLUID FOR USE BY AN ENGINE

(75) Inventors: Jesse G. James, Surfside, CA (US); Michael Desmond, Long Beach, CA (US)

(73) Assignee: Vanilla Gorilla, Inc., Austin, TX (US)

( * ) Notice: Subject to any disclaimer, the term of this patent is extended or adjusted under 35 U.S.C. 154(b) by 304 days.

(21) Appl. No.: 12/175,894

(22) Filed: Jul. 18, 2008

(65) Prior Publication Data

US 2009/0025676 A1    Jan. 29, 2009

Related U.S. Application Data

(60) Provisional application No. 60/951,687, filed on Jul. 24, 2007.

(51) Int. Cl.
*B60K 1/00* (2006.01)
(52) U.S. Cl. .......................................... 180/291; 180/311
(58) Field of Classification Search .................. 180/167, 180/225, 229, 291, 292, 298, 299, 311
See application file for complete search history.

(56) References Cited

U.S. PATENT DOCUMENTS

| | | | | |
|---|---|---|---|---|
| 3,945,463 A * | 3/1976 | Okano et al. | ................... | 180/311 |
| 4,153,266 A * | 5/1979 | Uhls | ............................ | 280/276 |
| 4,799,569 A * | 1/1989 | Hattori et al. | ................. | 180/219 |
| 5,054,571 A * | 10/1991 | Takasaka | ........................ | 180/219 |
| 5,653,206 A * | 8/1997 | Spurgin | ......................... | 180/229 |
| 5,975,230 A * | 11/1999 | Bourget | ......................... | 180/225 |
| 6,695,085 B2 * | 2/2004 | Mackle et al. | ................. | 180/167 |
| 7,464,954 B2 * | 12/2008 | Grow | ........................... | 280/304.3 |
| 2006/0027357 A1 * | 2/2006 | McKenzie et al. | .............. | 165/73 |
| 2006/0054372 A1 * | 3/2006 | Ohzono et al. | ................. | 180/229 |

* cited by examiner

*Primary Examiner* — Hau V Phan

(57) ABSTRACT

An apparatus and method for storing and supplying a fluid for use by a motorcycle engine includes a fluid tank assembly that can be mounted so that at least a portion of it is integral with a motorcycle frame. The assembly includes a center block that is mounted within a cavity in the motorcycle frame and two fluid reservoir housings, each mounted on opposite sides of the frame exterior and adjacent to the center block. The center block includes a hole of sufficient diameter that reservoir chambers, defined by the two reservoir housings, are in a free-flowing, fluid communication with one another via the center block hole. Moreover, the center block is a structural element thereby providing strength to the motorcycle frame.

18 Claims, 6 Drawing Sheets

METHOD AND APPARATUS FOR STORING AND SUPPLYING A FLUID FOR USE BY AN ENGINE

CROSS REFERENCE TO RELATED APPLICATIONS

This claims priority from U.S. Provisional Application No. 60/951,687, filed Jul. 24, 2007, which such application is incorporated herein by reference as if fully set forth herein.

FIELD OF INVENTION

This relates to motorcycles, and more particularly to a motorcycle fluid tank assembly.

BACKGROUND

Some motorcycle designs involve the use of engines that are supplied with a lubricant (e.g., oil) stored in a tank that is physically separated from the engine. In some designs, these tanks hang from the motorcycle frame and involve the use of two oil pumps. One pump sends oil from the tank via a first oil line to the engine, whereupon the oil ultimately works its way to the bottom of the engine. The other pump sends the oil from the bottom of the engine back to the oil tank via a second oil line.

These tanks that hang from the motorcycle frame frequently detract from the appearance of the motorcycle. Moreover, they often place a static load on the motorcycle frame.

SUMMARY OF THE ILLUSTRATED EMBODIMENTS

Embodiments of the invention include an apparatus for storing and supplying oil or other fluids for use by a motorcycle engine. The apparatus includes a fluid tank assembly that can be mounted so that at least a portion of it is integral with a motorcycle frame. The assembly includes a block member or center block that is mounted within a cavity in the motorcycle frame and further includes two fluid reservoir housings, each mounted on opposite sides of the frame exterior and adjacent to the center block. The center block includes a hole of sufficient diameter that reservoir chambers defined by the two reservoir housings are in fluid communication with one another via the center block hole.

In one aspect, an apparatus is for use with a motorcycle frame that is configured to support an engine having at least one engine fluid line extending from the engine. A block member is configured to be disposed within a frame cavity that is defined by the motorcycle frame. The block member defines a block member port configured to be coupled to the engine fluid line. A reservoir housing defines a reservoir chamber and is configured for connection to the frame. The reservoir chamber is in fluid communication with the block member port when the reservoir housing is connected to the frame and when the block member is disposed in the frame cavity.

In another aspect, the block member further defines a block member hole in fluid communication with the block member port. The reservoir chamber is in fluid communication with the block member port via the block member hole when the reservoir housing is connected to the frame and when the block member is disposed in the frame cavity. The block member further includes a brace member extending across the block member hole.

In another aspect, the reservoir housing includes a flange defining a plurality of reservoir mounting holes, the motorcycle frame defines a plurality of frame mounting holes, and the block member defines a plurality of block mounting holes. The plurality of reservoir mounting holes, the plurality of frame mounting holes and the plurality of block mounting holes are in register when the reservoir housing is connected to the frame and when the block member is disposed in the frame cavity.

In an alternative embodiment, an apparatus is for use with a motorcycle frame defining a frame cavity and further defining a plurality of frame mounting holes. The frame is configured to support an engine having an engine fluid line extending from the engine. A block member is configured to be disposed within the frame cavity. The block member defines a plurality of block mounting holes, a block member first port, a block member second port and a block member hole in fluid communication with the block member first and second ports. The block member first port is configured to be coupled to the engine fluid line.

A first reservoir housing is configured for connection to the frame and for extending generally laterally away from the frame in a first direction. The first reservoir housing defines a first reservoir chamber and includes a first flange that in turn defines a plurality of first reservoir mounting holes. A second reservoir housing is configured for connection to the frame and for extending generally laterally away from the frame in a second direction. The second reservoir housing defines a second reservoir chamber and includes a second flange that in turn defines a plurality of second reservoir mounting holes.

The first reservoir chamber is in fluid communication with the second reservoir chamber via the block member hole when the first reservoir housing and the second reservoir housing are connected to the frame and when the block member is disposed in the frame cavity.

The block member second port is disposed at an elevation generally above the first and second reservoir chambers when the first and second reservoir housings are connected to the frame and when the block member is disposed in the frame cavity. A sealing member is configured to removably mate with the block member second port thereby closing the block member second port.

The plurality of first reservoir mounting holes, the plurality of second reservoir mounting holes, the plurality of frame mounting holes and the plurality of block mounting holes are in register when the first and second reservoir housings are connected to the frame and when the block member is disposed in the frame cavity.

There are additional aspects to the present inventions. It should therefore be understood that the preceding is merely a brief summary of some embodiments and aspects of the present inventions. Additional embodiments and aspects are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

These and/or other aspects and advantages of the present invention will become apparent and more readily appreciated from the following description of certain embodiments, taken in conjunction with the accompanying drawings of which.

DETAILED DESCRIPTION

Figure 1:
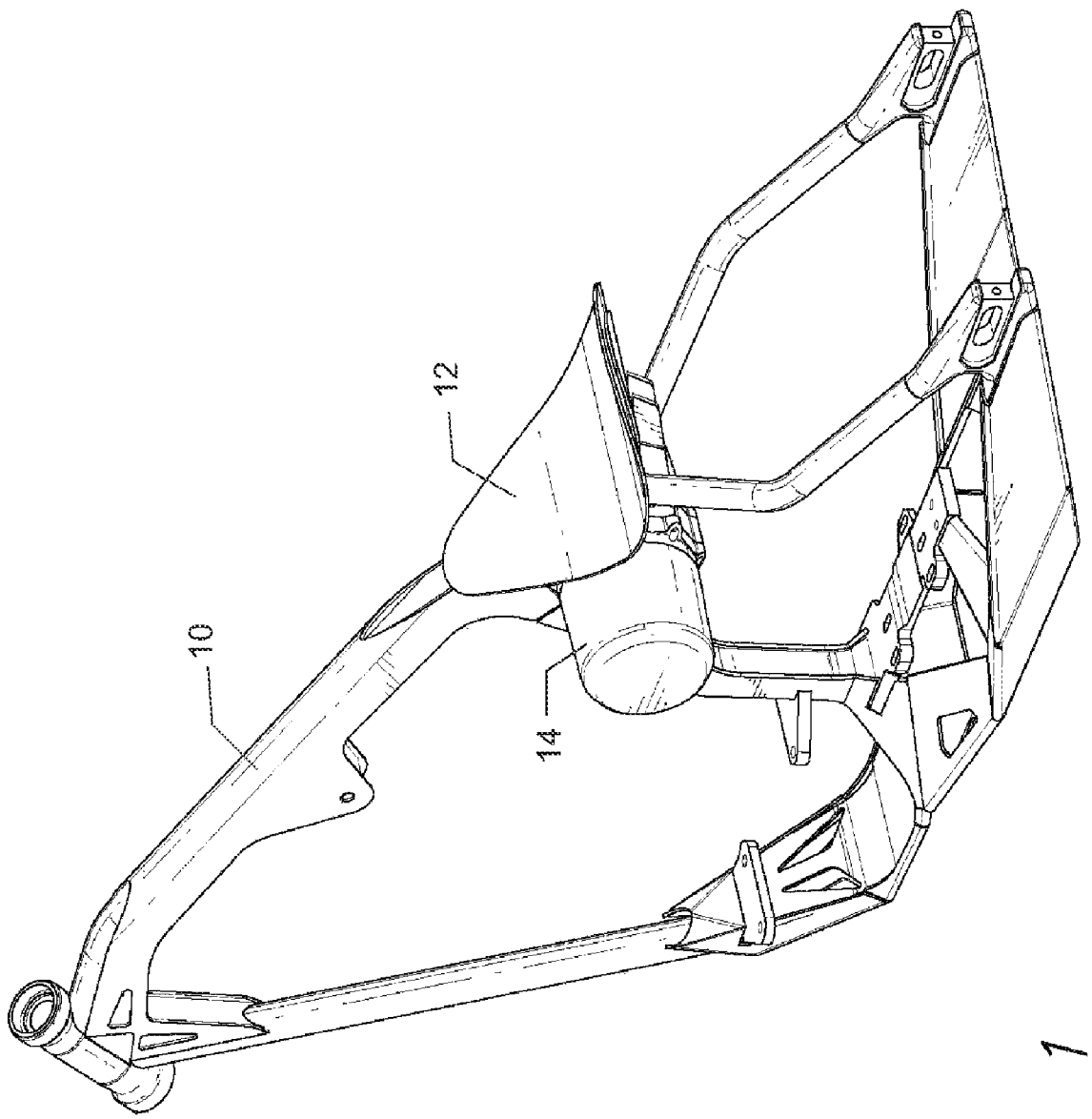
FIG. 1 is a rear perspective view of a motorcycle frame with a fluid tank assembly in accordance with an embodiment of the invention.

The following description is of the best mode presently contemplated for carrying out the invention. Reference will be made in detail to embodiments of the present invention, examples of which are illustrated in the accompanying drawings, wherein like reference numerals refer to like elements throughout. It is understood that other embodiments may be used and structural and operational changes may be made without departing from the scope of the present invention.

Embodiments of the invention include an apparatus and method for storing and supplying oil or other lubricants or fluids for use by a motorcycle engine. Disclosed is a fluid tank assembly that can be mounted so that at least a portion of it is integral with a motorcycle frame. The assembly includes a block member or center block that is mounted within a cavity in the motorcycle frame and two fluid reservoir housings, each mounted on opposite sides of the frame exterior and adjacent to the center block. The center block includes a hole of sufficient diameter that reservoir chambers defined by the two reservoir housings are in a free-flowing, fluid communication with one another via the center block hole. Moreover, the center block is a structural element thereby providing strength to the motorcycle frame. Thus the assembly provides an aesthetically-pleasing, fluid storage structure that permits easy servicing or cleaning of the chambers of the fluid reservoir housings which can be readily removed from the motorcycle frame.

Figure 2:
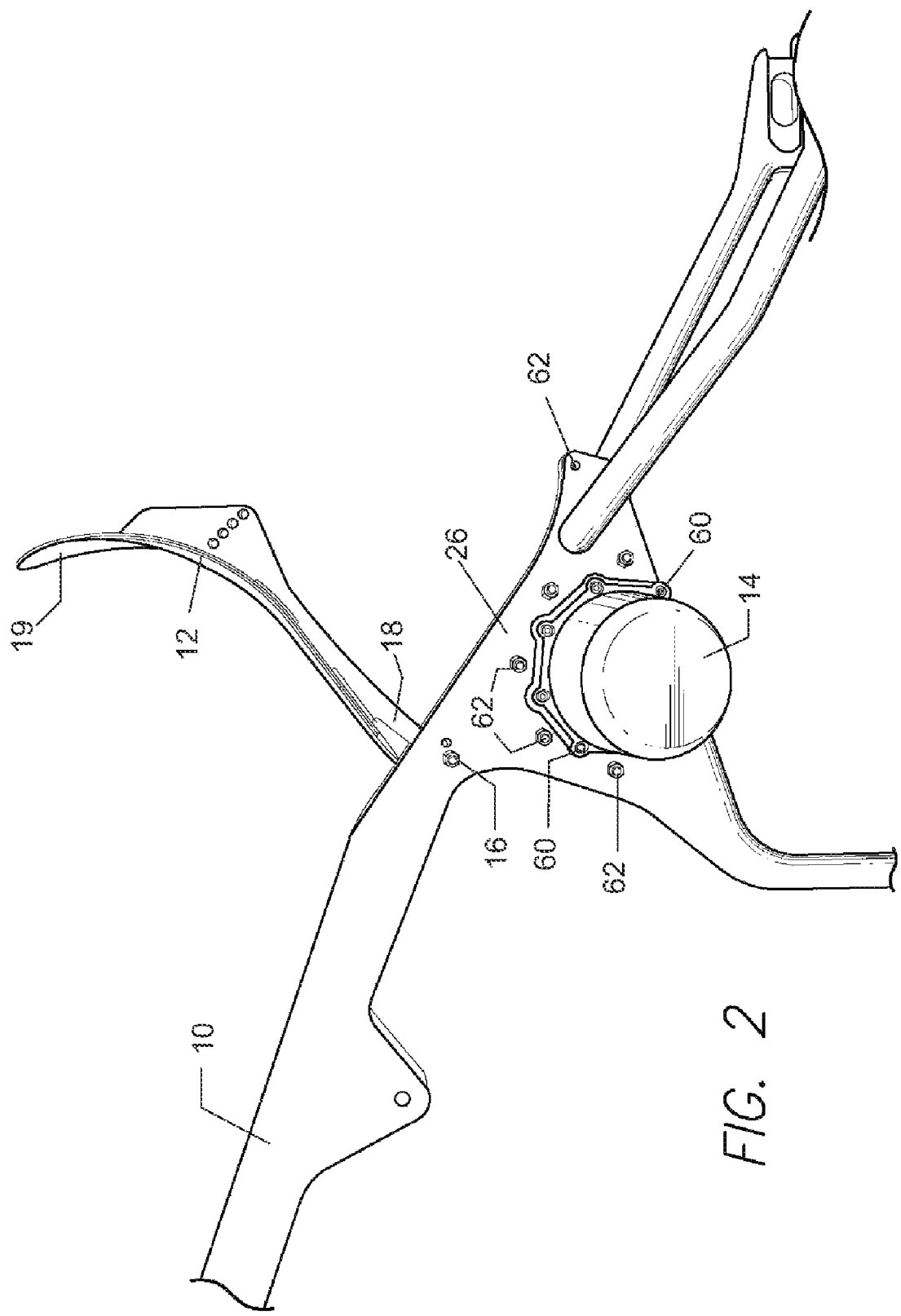
FIG. 2 is a close-up, perspective view of a portion of the motorcycle frame and fluid tank assembly of FIG. 1, with a seat in a raised position.

FIG. 1 is a rear perspective view of a motorcycle frame with a fluid tank assembly in accordance with an embodiment of the invention. Shown is a motorcycle frame 10, a rotatable seat 12 attached to the frame 10, and a fluid tank assembly 14 attached to the frame 10 and disposed generally under the seat 12. Although not shown, the motorcycle frame 10 is configured to support an engine having one or more engine fluid lines, such as oil lines, extending from the engine and leading to the fluid tank assembly 14. FIG. 2 is a close-up, side perspective view of the seat 12, the fluid tank assembly 14 and a portion of the motorcycle frame 10 of FIG. 1. The seat 12 has a forward portion 18 and a rear portion 19. The seat forward portion 18 is pivotally attached to the frame 10 at a pivot location 16 so that the seat rear portion 19 can be raised as shown in FIG. 2 and lowered as shown in FIG. 1.

Figure 3:
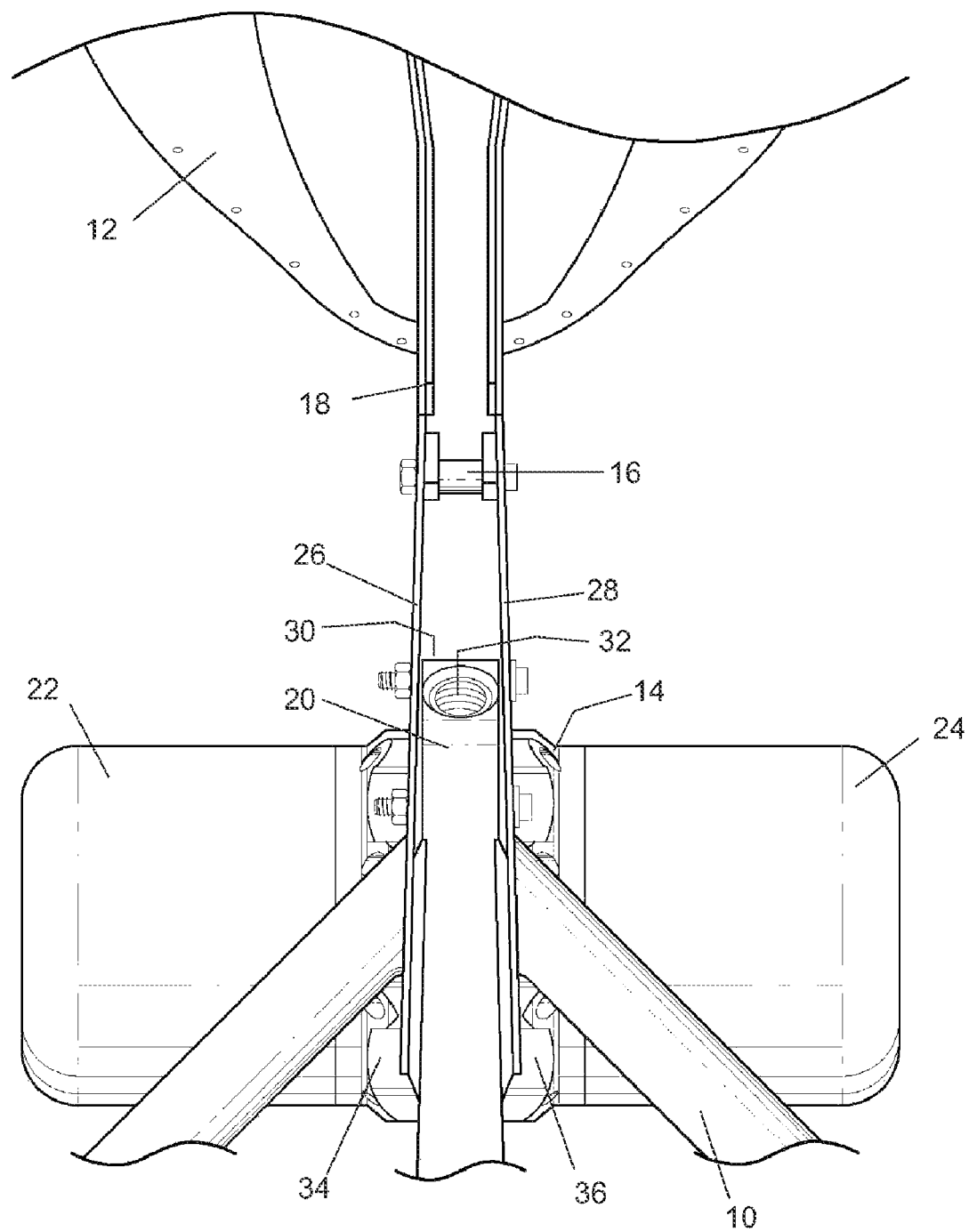
FIG. 3 is a rear elevation view of a portion of the motorcycle frame and fluid tank assembly of FIG. 1 with the seat in the raised position.

FIG. 3 is a rear elevation view of the fluid tank assembly 14 and a portion of the motorcycle frame 10 and the seat 12 with the seat 12 in the raised position. The frame 10 has a frame left wall 26 and a frame right wall 28 that define at least a portion of a frame cavity 30. The fluid tank assembly 14 includes a center block 20, a first reservoir housing 22 that defines an interior first reservoir chamber (not shown) for holding a fluid and a second reservoir housing 24 that defines an interior second reservoir chamber (not shown) for holding the fluid. The frame left and right walls 26, 28 each define a frame wall reservoir hole (not shown) having a circumference that corresponds in shape to and is about the same size as each of the circumferences of the first and second reservoir chambers of the first and second reservoir housings 22, 24, respectively. The center block 20 is sized so that it fits within the frame cavity 30 just below the seat 12.

The first reservoir housing 22 is removably mounted on the frame 10 so that it abuts the frame left wall 26 at a location adjacent to the center block 20 when it is disposed in the frame cavity 30 and so that the first reservoir housing 22 covers the frame left wall reservoir hole and extends laterally away from the frame 10 in a first direction. Similarly, the second reservoir housing 24 is removably mounted on the frame 10 so that it abuts the frame right wall 28 at a location adjacent to the center block 20 when it is disposed in the frame cavity 30 and so that the second reservoir housing 24 covers the frame right wall reservoir hole and extends laterally away from the frame 10 in a second direction that is generally opposite from the first direction.

The center block 20 includes an internally-threaded, fluid refill port 32 that is disposed directly below the seat 12 when the center block is in the frame cavity 30 and when the seat 12 is in the lowered position. Thus the seat 12 can be rotated upward about the pivot location 16 to expose the fluid refill port 32 when it is necessary to add fluid, such as oil, from an external source for use in operation of the motorcycle. Although not shown in FIG. 3, the fluid tank assembly 14 further includes a removable, threaded plug that is adapted to mate with the fluid refill port 32 for manually closing or opening it.

Figure 4:
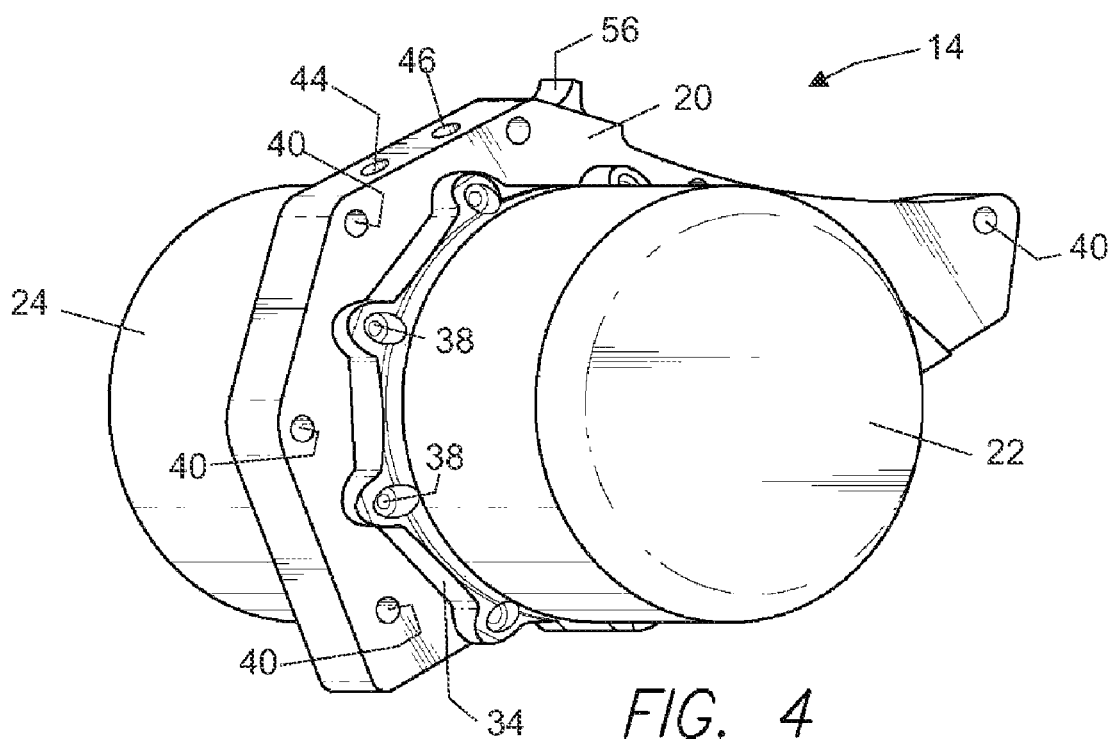
FIG. 4 is a side perspective view of the fluid tank assembly of FIG. 1.
Figure 5:
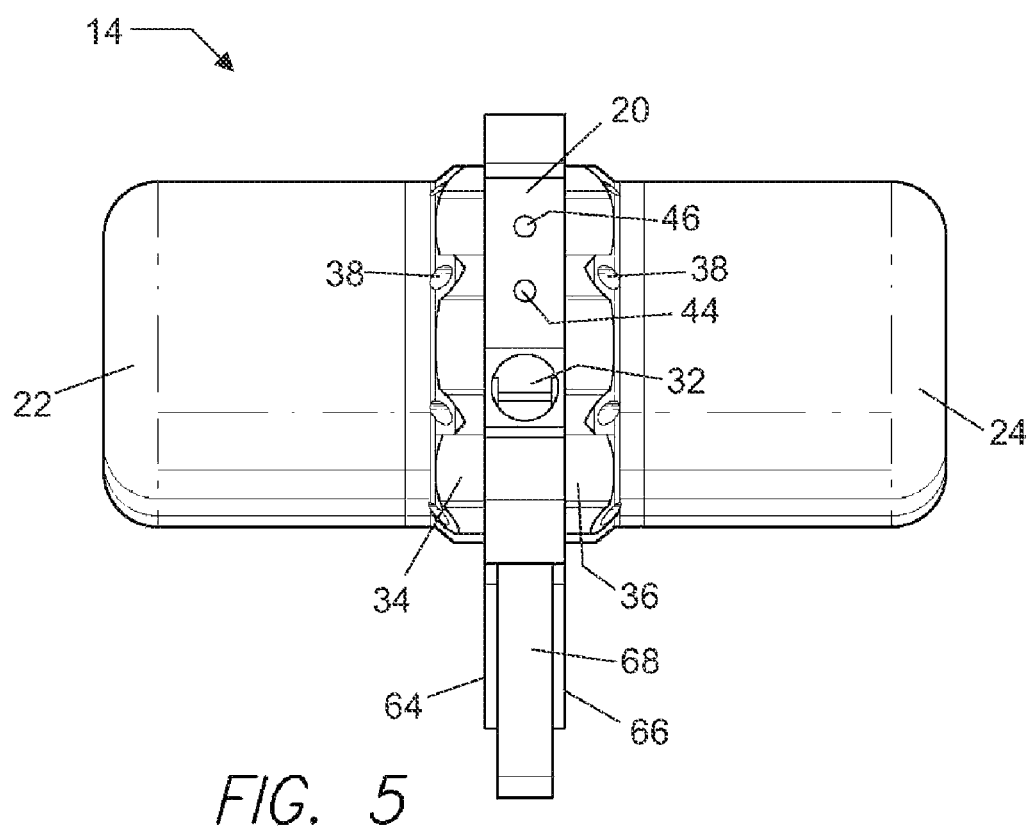
FIG. 5 is a top plan view of the fluid tank assembly of FIG. 4.

FIGS. 4 and 5 show the fluid tank assembly 14 with the center block 20 and the first and second reservoir housings 22, 24 in an assembled configuration, but located outside of and apart from the motorcycle frame 10 (FIG. 1) for clarity of illustration. The first and second reservoir housings 22, 24 are generally cylindrical in shape and have respectively first and second flanges 34, 36 that are configured to abut the frame left wall 26 and frame right wall 28, respectively, when assemble on the frame 10 as best seen in FIG. 3. Each of the first and second flanges 34, 36 defines a plurality of reservoir mounting holes or flange holes 38 that are arrayed in a generally circular pattern around the circumference of the first and second reservoir housings 22, 24. Those flange holes 38 in the first flange 34 are in register with those other flange holes 38 that are in the second flange 36, and all of the flange holes 38 are in register with center block mounting holes (not shown in FIGS. 4 and 5) in the center block 20 and with a first plurality of frame mounting holes (not shown in FIGS. 4 and 5) disposed in the frame right and left walls 26, 28. With all of these previously-described holes so disposed, bolts, screws, pins, fasteners or other attachment devices can be inserted through all of these holes for removably connecting the first and second reservoir housings 22, 24 to the center block 20, to the frame 10 and to each other.

A plurality of frame attachment holes 40 extends transversely through the center block 20. Most of these frame attachment holes 40 are arrayed in a generally arcuate pattern around a plurality of center block mounting holes 42 (FIG. 6) which is discussed in more detail below. These frame attachment holes 40 are in register with a second plurality of frame mounting holes (not shown in FIGS. 4 and 5) disposed in the frame right and left walls 26, 28, so that bolts, screws, pins, fasteners or other attachment devices can be inserted through all of these holes for removably securing the center block 20 in the cavity 30 of the frame 10 (FIG. 3). In the illustrated embodiment a plurality of center block fasteners 62 (e.g., nuts and bolts) are used for this purpose as seen in FIG. 2.

Figure 6:
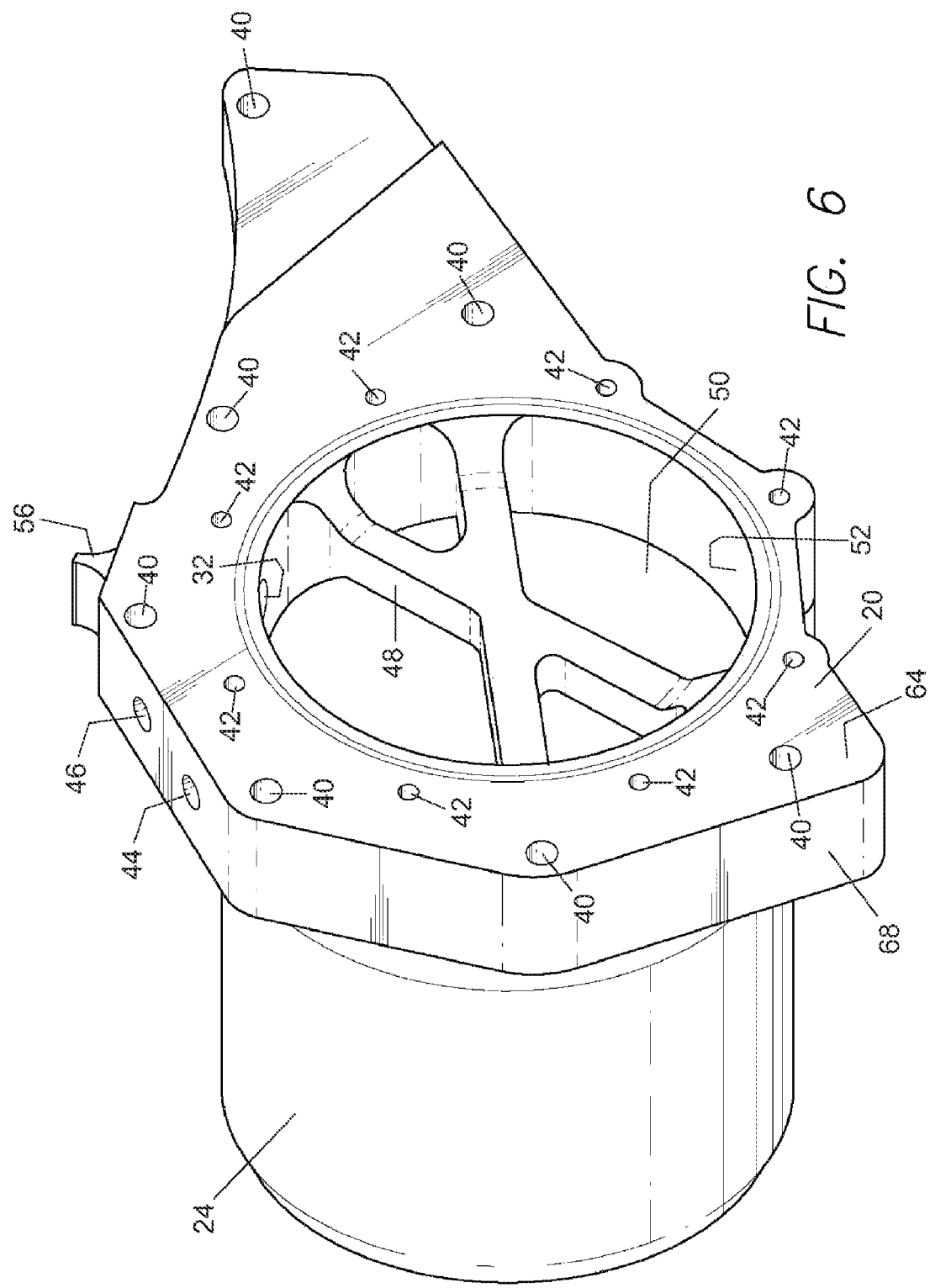
FIG. 6 is a side perspective view of the fluid tank assembly of FIG. 4 with one of the reservoir housings removed.

FIG. 6 shows certain components of the fluid tank assembly 14 including the center block 20 and the second reservoir housing 24 in an assembled configuration outside of the motorcycle frame 10, and with the first reservoir housing 22 (FIG. 4) removed for clarity of illustration. The center block 20 is an irregularly-shaped member that is sized to fit within the cavity 30 of the frame 10 (FIG. 3). According to one embodiment of the invention, at its greatest length the center block 20 is about 11.5 inches with a transverse maximum width dimension of about 7.5 inches and a thickness of about 1.5 inches. However other embodiments may include different dimensions and shapes.

The center block 20 has a center block first surface 64, a center block second surface 66 (FIG. 5) and a center block third surface 68 connecting the center block first and second surfaces 64, 66. The center block first surface 64 is disposed adjacent to and abuts the frame left wall 26 when the center block 20 is in the frame cavity 30 (FIG. 3). Similarly, the center block second surface 66 is disposed adjacent to and abuts the frame right wall 28 when the center block 20 is in the frame cavity 30.

The center block 20 defines a generally cylindrically-shaped center block reservoir hole 50 which is further defined by a generally cylindrically-shaped reservoir hole side wall 52 extending transversely through the center block 20 and connecting the center block first and second surfaces 64, 66. In one embodiment the reservoir hole 50 has a diameter of about 5 inches, although diameters of greater or smaller sizes may be used in other embodiments. The circumference and shape of the reservoir hole 50 corresponds to and is about the same in size as each of the circumferences of the first and second reservoir chambers of the first and second reservoir housings 22, 24. Moreover the circumference and shape of the reservoir hole 50 also corresponds to and is about the same in size as each of the circumferences of the frame wall reservoir holes (not shown) in the frame left and right walls 26, 28. Thus when the fluid tank assembly 14 is assembled and mounted on the frame 10, a combined fluid storage reservoir volume is formed and comprised of the first and second reservoir chambers that are in a free-flowing, fluid communication with one another via the center block reservoir hole 50 and via the frame wall reservoir holes.

The center block 20 further includes a generally X-shaped brace member 48 that is integrally formed with the center block 20, and more particularly is integrally formed with the reservoir hole side wall 52. The brace member 48 is disposed within and extends generally across the reservoir hole 50 thereby connecting generally opposing surfaces of the side wall 52 and effectively dividing the reservoir hole 50 into four sections or ports. The brace member 48 provides structural strength to the center block 20 so that the center block 20 in turn can provide enhanced structural strength to the overall motorcycle frame 10.

Still referring to FIG. 6, the center block 20 further defines a first fluid line port 44 and a second fluid line port 46, each of which extends from the center block third surface 68 through the reservoir hole side wall 52 thus leading into the reservoir hole 50. The first and second fluid line ports 44, 46 therefore are each in fluid communication with the first and second reservoir chambers via the reservoir hole 50. Thus engine fluid supply and return lines (not shown) can be connected or otherwise coupled to the first and second fluid line ports 44, 46 at the center block third surface 68 for supplying a flow of fluid, such as oil, to and from the motorcycle engine. (In alternative embodiments however, the first and second fluid line ports 44, 46, or either one of them, can extend from the center block first surface 64 or the center block second surface 66 into the reservoir hole 50.)

Also as previously mentioned, the fluid refill port 32 extends from the center block third surface 68 through the reservoir hole side wall 52 and into the reservoir hole 50 for use in supplying additional fluid to the system. Thus the fluid refill port 32 is disposed at an elevation that is generally above the first and second reservoir chambers of the first and second reservoir housings 22, 24 for gravity-induced filling of these chambers. A threaded plug 56 removably mates with internal threads (not shown in FIG. 6) of the fluid refill port 32 so that the threaded plug 56 can manually be inserted into the fluid refill port 32 thereby closing it from an outer face surface of the center block 20, i.e., the center block third surface 68. While FIG. 6 depicts a threaded plug 56, alternative embodiments of the invention include other sealing members or devices that are configured to removably mate with the fluid refill port 32.

The center block 20 further includes the plurality of center block mounting holes 42 extending transversely through the center block 20 and disposed in a generally circular array around the center block reservoir hole 50. As previously mentioned, these center block mounting holes 42 are in register with the reservoir housing flange holes 38 (FIG. 4) for both the first and second reservoir housings 22, 24 and further are in register with the first plurality of frame mounting holes (not shown) in the frame right and left walls 26, 28 (FIG. 3). Thus bolts, screws, pins or other fasteners or attachment devices can be inserted through all of these holes for removably securing the first and second reservoir housings 22, 24 to the center block 20, to the frame 10 and to each other. In the illustrated embodiment a plurality of reservoir bolts 60 are used for this purpose as seen in FIG. 2.

As discussed above, the embodiment shown in FIGS. 1-6 involves two generally cylindrically-shaped reservoir housings defining two generally cylindrically-shaped reservoir chambers in fluid communication with one another via a generally cylindrically-shaped hole in a center block and via generally circular-shaped holes in the frame sidewalls. It will be appreciated by those skilled in the art however that alternative embodiments of the invention include other geometries and arrangements. For example, an alternative embodiment may comprise only one reservoir housing extending from only one side of a cycle frame. Moreover other embodiments may include one or more reservoir housings and reservoirs and associated holes having any one or more shapes and geometries that are other than cylindrical or circular, such as for example, rectilinear, conical, frusto-conical, spherical, tapered, asymmetric, irregular, etc. Yet other embodiments may include center blocks having center block reservoir holes and/or frame sidewalls having frame holes, some or all of which have a shape or geometry other than circular, such as for example rectilinear, oblong, asymmetric, irregular, etc.

Figure 7:
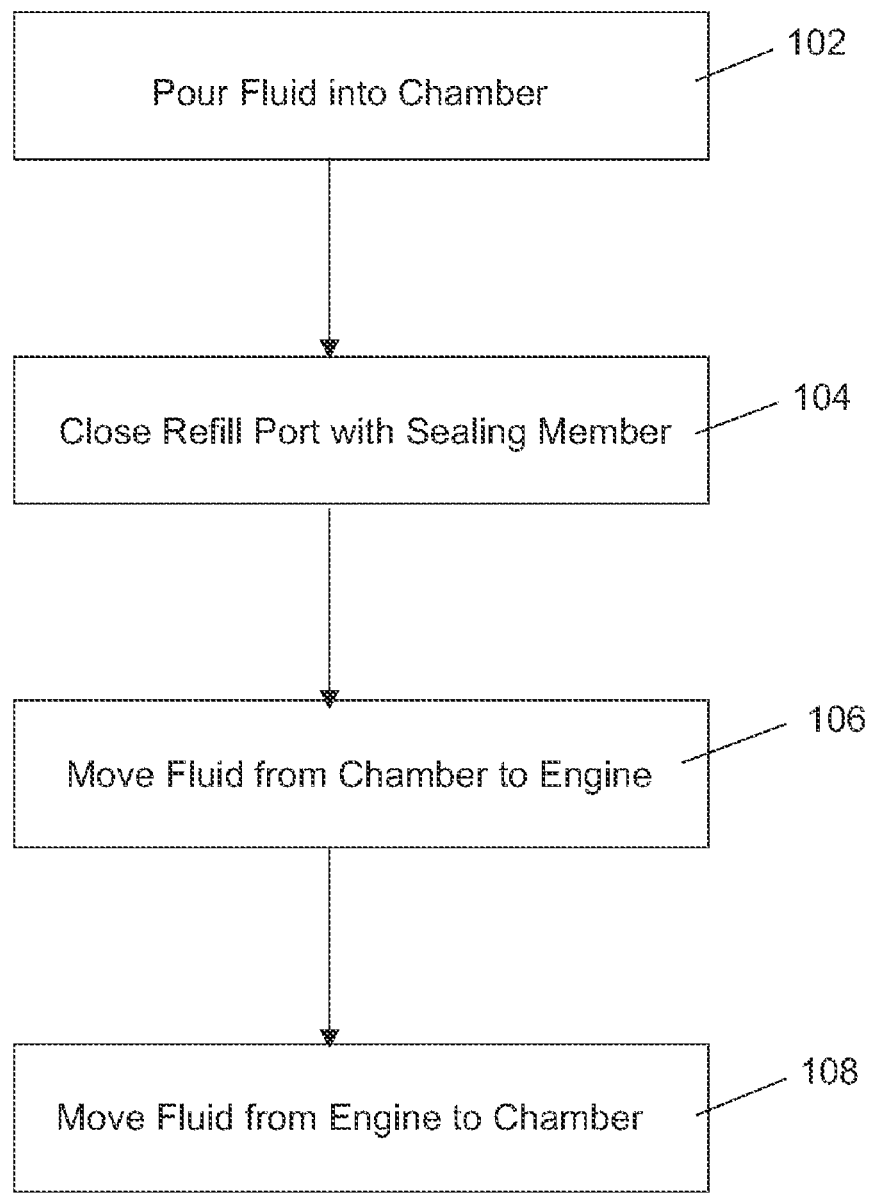
FIG. 7 is a simplified process flow diagram for a method of supplying a fluid to a motorcycle engine.

FIG. 7 depicts a simplified process flow diagram for a method for supplying a fluid, such as for example oil, to a motorcycle engine mounted on a motorcycle frame. The fluid is poured into a chamber via a block member refill port of a block member. (Step 102) The block member is disposed within a frame cavity that is defined at least in part by the motorcycle frame. The block member refill port extends from an outer surface of the block member through the block member itself to a block member hole. This block member hole in turn also is defined by the block member and extends generally transversely through it. The chamber is defined by a first reservoir housing, a second reservoir housing and the block member hole. The first reservoir housing and the second reservoir housing are attached to the motorcycle frame.

Next, the block member refill port is closed with a sealing member, such as for example a threaded plug, configured to mate with the block member refill port. (Step 104)

The fluid is moved from the chamber to the motorcycle engine via a block member first port. (Step 106) This port is defined by the block member and extends from the outer surface of the block member to the block member hole. The fluid also is moved from the motorcycle engine back into the chamber via a block member second port. (Step 108) This port also is defined by the block member and extends from the outer surface of the block member to the block member hole.

In view of the above, it will be appreciated that embodiments of the invention overcome many of the long-standing problems in the art by providing an apparatus and method for storing and supplying fluids for use by a motorcycle engine. According to one embodiment, a fluid tank assembly includes a center block and two fluid reservoir housings. The center block is mounted within a cavity in the motorcycle frame. The fluid reservoir housings are mounted on opposite sides of the frame exterior and adjacent to the center block. The reservoir housings are easily removable for cleaning or other servicing. Thus the assembly provides an aesthetically-pleasing, yet functional, fluid storage structure that is integral with and provides structural strength for the motorcycle frame.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. An apparatus for use with a motorcycle frame configured to support an engine having an engine fluid line extending from the engine, wherein the motorcycle frame defines a frame cavity, the apparatus comprising:
    a block member configured to be disposed within the frame cavity, wherein the block member defines a block member port configured to be coupled to the engine fluid line; and
    a reservoir housing configured for connection to the frame, wherein the reservoir housing defines a reservoir chamber,
    wherein the reservoir chamber is in fluid communication with the block member port when the reservoir housing is connected to the frame and when the block member is disposed in the frame cavity.

2. The apparatus of claim 1 wherein the block member further defines a block member hole in fluid communication with the block member port, wherein the reservoir chamber is in fluid communication with the block member port via the block member hole when the reservoir housing is connected to the frame and when the block member is disposed in the frame cavity, and wherein the block member further includes a brace member extending across the block member hole.

3. The apparatus of claim 1 wherein the block member port is a block member first port, wherein the block member further defines a block member second port and further defines a block member hole in fluid communication with the block member first port and the block member second port, wherein the reservoir chamber is in fluid communication with the block member first port and the block member second port via the block member hole when the reservoir housing is connected to the frame and when the block member is disposed in the frame cavity,
    wherein the block member second port is disposed at an elevation generally above the reservoir chamber when the reservoir housing is connected to the frame and when the block member is disposed in the frame cavity,
    the apparatus further comprising a sealing member configured to removably mate with the block member second port thereby closing the block member second port.

4. The apparatus of claim 3 wherein the motorcycle frame is further configured for use with a motorcycle seat, and wherein the sealing member is disposed below the seat when the block member is disposed in the frame cavity and when the sealing member is removably mated with the block member second port.

5. The apparatus of claim 1 wherein the motorcycle frame defines a plurality of frame mounting holes, wherein the reservoir housing includes a flange defining a plurality of reservoir mounting holes, wherein the block member defines a plurality of block mounting holes, and wherein the plurality of reservoir mounting holes, the plurality of frame mounting holes and the plurality of block mounting holes are in register when the reservoir housing is connected to the frame and when the block member is disposed in the frame cavity.

6. The apparatus of claim 1 wherein the reservoir housing is a first reservoir housing and the reservoir chamber is a first reservoir chamber, and wherein the first reservoir housing extends generally laterally away from the frame in a first direction when the first reservoir housing is connected to the frame, the apparatus further comprising:
    a second reservoir housing configured for connection to the frame, wherein the second reservoir housing defines a second reservoir chamber, wherein the second reservoir housing extends generally laterally away from the frame in a second direction that is generally opposite from the first direction when the second reservoir housing is connected to the frame,
    wherein the block member further defines a block member hole in fluid communication with the block member port, and
    wherein the first reservoir chamber is in fluid communication with the second reservoir chamber via the block member hole, when the first reservoir housing and second reservoir housing are connected to the frame and when the block member is disposed in the frame cavity.

7. The apparatus of claim 6 wherein the block member is further configured to be removably disposed within the frame cavity, and wherein each of the first reservoir housing and the second reservoir housing is further configured to be removably connected to the frame.

8. The apparatus of claim 6 wherein the motorcycle frame defines a plurality of frame mounting holes, wherein the first reservoir housing includes a first flange defining a plurality of first reservoir mounting holes, wherein the second reservoir housing includes a second flange defining a plurality of second reservoir mounting holes, wherein the block member defines a plurality of block mounting holes, and wherein the plurality of first reservoir mounting holes, the plurality of second reservoir mounting holes, the plurality of frame mounting holes and the plurality of block mounting holes are in register when the first reservoir housing and the second reservoir housing are connected to the frame and when the block member is disposed in the frame cavity.

9. The apparatus of claim 6 wherein the engine fluid line is an engine first fluid line, wherein the engine further has an engine second fluid line extending from the engine,
wherein the block member port is a block member first port,
wherein the block member further defines a block member second port in fluid communication with the block member hole, and
wherein the block member second port is configured to be coupled to the engine second fluid line.

10. The apparatus of claim 9 wherein the engine first fluid line is configured for transporting oil from the engine to the block member first port, and wherein the engine second fluid line is configured for transporting oil from the block member second port to the engine.

11. An apparatus for use with a motorcycle frame configured to support an engine having an engine fluid line extending from the engine, wherein the motorcycle frame defines a frame cavity and further defines a plurality of frame mounting holes, the apparatus comprising:
a block member configured to be disposed within the frame cavity, wherein the block member defines a block member first port, a block member second port and a block member hole in fluid communication with the block member first port and the block member second port, wherein the block member first port is configured to be coupled to the engine fluid line, and wherein the block member further defines a plurality of block mounting holes;
a sealing member configured to removably mate with the block member second port thereby closing the block member second port;
a first reservoir housing configured for connection to the frame and for extending generally laterally away from the frame in a first direction when the first reservoir housing is connected to the frame, wherein the first reservoir housing defines a first reservoir chamber, and wherein the first reservoir housing includes a first flange defining a plurality of first reservoir mounting holes; and
a second reservoir housing configured for connection to the frame and for extending generally laterally away from the frame in a second direction when the second reservoir housing is connected to the frame, wherein the second reservoir housing defines a second reservoir chamber, and wherein the second reservoir housing includes a second flange defining a plurality of second reservoir mounting holes,
wherein the first reservoir chamber is in fluid communication with the second reservoir chamber via the block member hole when the first reservoir housing and the second reservoir housing are connected to the frame and when the block member is disposed in the frame cavity,
wherein the plurality of first reservoir mounting holes, the plurality of second reservoir mounting holes, the plurality of frame mounting holes and the plurality of block mounting holes are in register when the first reservoir housing and the second reservoir housing are connected to the frame and when the block member is disposed in the frame cavity, and
wherein the block member second port is disposed at an elevation generally above the first reservoir chamber and the second reservoir chamber when the first reservoir housing and the second reservoir housing are connected to the frame and when the block member is disposed in the frame cavity.

12. The apparatus of claim 11 wherein the block member further includes a brace member extending across the block member hole.

13. The apparatus of claim 11 wherein the block member is further configured to be removably disposed within the frame cavity, and wherein each of the first reservoir housing and the second reservoir housing is further configured to be removably connected to the frame.

14. A method for supplying a fluid to a motorcycle engine mounted on a motorcycle frame, wherein the method comprises:
pouring the fluid into a chamber defined by a first reservoir housing, a second reservoir housing and a block member hole, wherein the block member hole is defined by a block member and extends generally transversely through the block member,
wherein the block member is disposed within a frame cavity defined at least in part by the motorcycle frame, and
wherein each of the first reservoir housing and the second reservoir housing is attached to the motorcycle frame;
moving the fluid from the chamber to the motorcycle engine via a block member first port defined by the block member and extending from an outer surface of the block member to the block member hole; and
moving the fluid from the motorcycle engine to the chamber via a block member second port defined by the block member and extending from the outer surface of the block member to the block member hole.

15. The method of claim 14 wherein the step of pouring the fluid into the chamber further comprises pouring the fluid into the chamber via a block member third port defined by the block member and extending from the outer surface of the block member to the block member hole.

16. The method of claim 15 further comprising the step of closing the block member third port with a sealing member configured to mate with the block member third port.

17. The method of claim 14 wherein the fluid is oil.

18. The method of claim 14 wherein the block member is removably disposed within the frame cavity, and wherein each of the first reservoir housing and the second reservoir housing is removably connected to the frame.

* * * * *